United States Patent [19]
Baumgardner et al.

[11] 3,809,462
[45] May 7, 1974

[54] VIEW EXPANDING AND DIRECTING OPTICAL SYSTEM

[75] Inventors: John D. Baumgardner; Dorothy J. Ebeling, both of Holland, Mich.

[73] Assignee: Donnelly Mirrors Incorporated, Holland, Mich.

[22] Filed: July 25, 1972

[21] Appl. No.: 274,968

Related U.S. Application Data

[63] Continuation-in-part of Ser. No. 252,611, May 12, 1972.

[52] U.S. Cl. .................. 350/302, 350/211, 350/301
[51] Int. Cl. ............................................. G02b 5/08
[58] Field of Search .......... 350/103, 211, 286, 287, 350/301, 302, 307, 288, 299

[56] References Cited
UNITED STATES PATENTS
3,525,807   8/1970   Herriott ............................. 350/211

*Primary Examiner*—Ronald L. Wibert
*Assistant Examiner*—Michael J. Tokar
*Attorney, Agent, or Firm*—Price, Heneveld, Huizenga & Cooper

[57] ABSTRACT

An optical system for vehicles providing expanded and demagnified fields of view for overcoming blind spots normally encountered with presently known vision systems. The several forms of the invention utilize previously optically nonfunctional areas of the vehicle such as roof areas above the rear window and side areas in the rear roof support posts to provide expanded vision areas laterally and to the rear of the vehicle. The optical systems variously includes negative Fresnel lenses alone or in combination with regular prisms or Fresnel prisms, all of which are viewed via conventionally mounted rear view mirrors adjacent the vehicle driver either alone or in periscopic systems including additional second and third mirrors.

15 Claims, 21 Drawing Figures

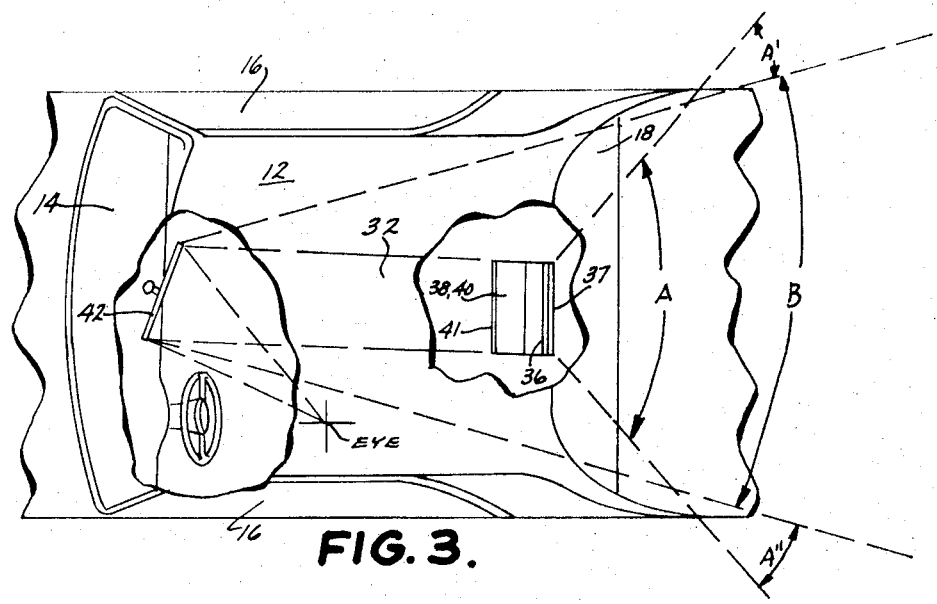
FIG. 3.
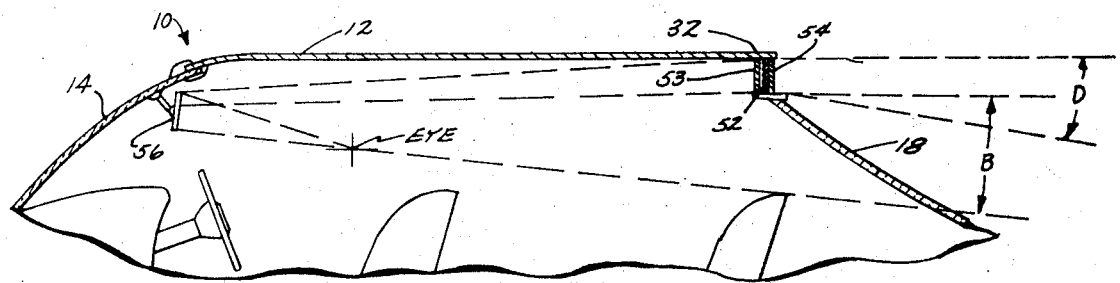
FIG. 6.
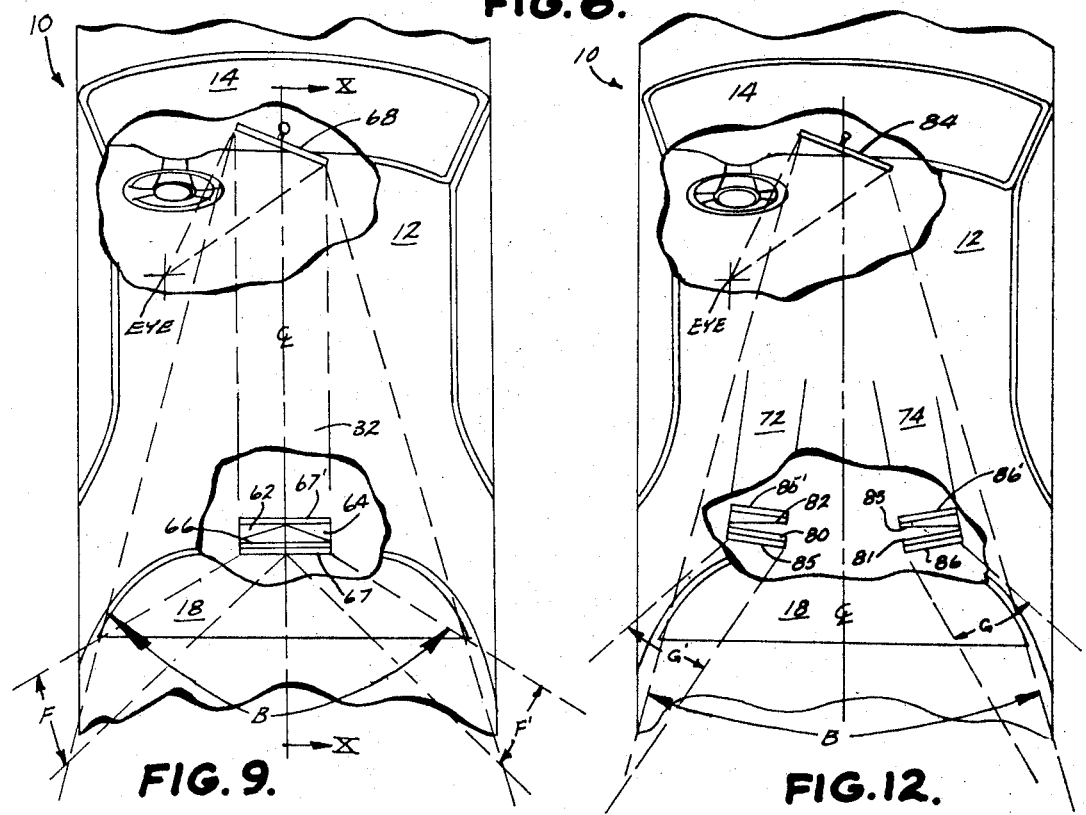
FIG. 9.
FIG. 12.

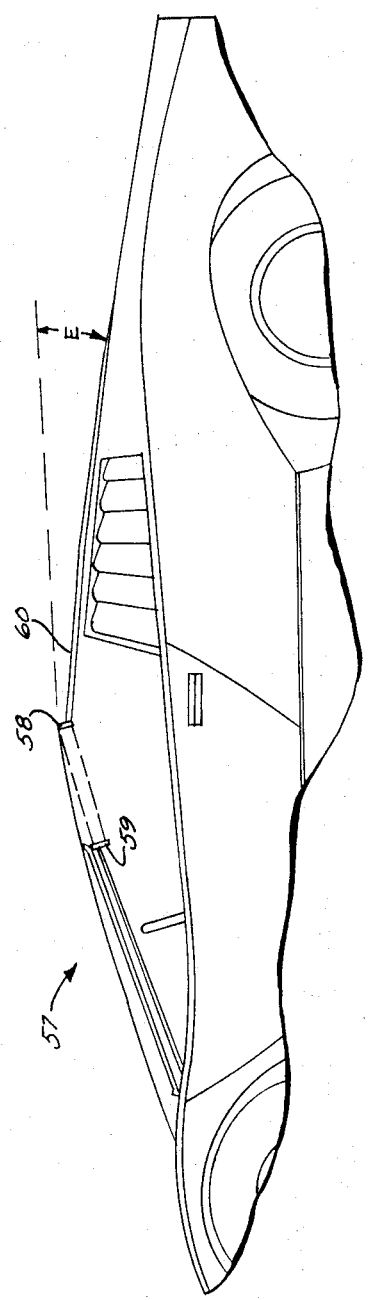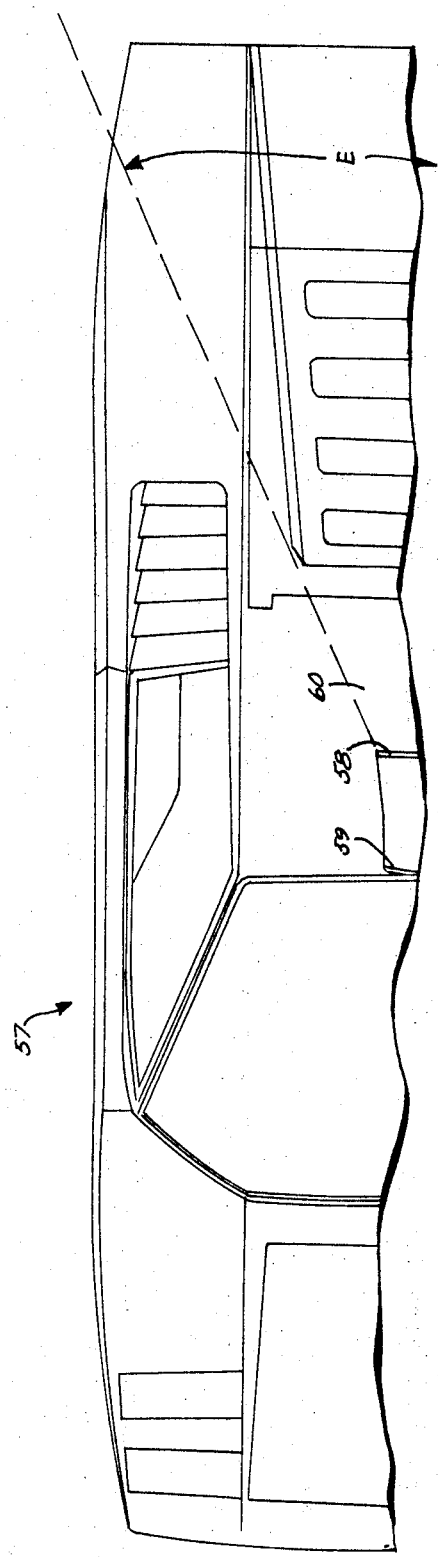

VIEW EXPANDING AND DIRECTING OPTICAL SYSTEM

This application is a continuation-in-part of our previously filed application entitled VIEW EXPANDING AND DIRECTING OPTICAL SYSTEM, Ser. No. 252,611, filed May 12, 1972.

The present invention relates to optical systems for expanding and directing fields of view, and, more particularly, to optical systems for vehicles which expand and direct the fields of view visible from within the vehicle in order to eliminate blind spots.

BACKGROUND OF THE INVENTION

Continuing research and development relating to vehicle safety standards in the United States and other countries has led to various modified optical system concepts in the field of vehicle optics. Typically, vision aiding devices for automobiles have been awkward, bulky, and unsightly when secured to various portions of the automobile. In order to provide the greatest possible visual aid to the driver and/or passengers within the vehicle, such vision aiding devices have protruded a significant distance beyond the normal exterior lines of the automobile in order to provide a proper field of view. However, we have found that it is possible to utilize additional areas of the vehicle to provide the greatest possible fields of view for the persons within the vehicle while maintaining the overall aesthetic design of the vehicle demanded by the consuming public in the marketplace. Therefore, the optical systems presented in our previous application have been modified as disclosed herein in order to optimize the expanded fields of view obtainable with such optical systems.

Additionally, it has been found that in some applications certain of the optical elements presented in our previous application may be utilized alone as well as in combination with other optical elements to provide the greater fields of view referred to above. In this respect, the exterior design of the automobile has been kept in mind while the optical systems, including those using fewer components, have been positioned in keeping with that exterior design to provide the expanded and directed fields of view.

SUMMARY OF THE INVENTION

Accordingly, it is an object and purpose of the present invention to provide an optical system for vehicles wherein the optical components are positioned in previously optically nonfunctional areas of the vehicle in order to provide greatly enlarged and specifically directed fields of view for the driver and/or passengers of the vehicle. A concurrent purpose is to provide an optical system which may be used in conjunction with the normal rear vision means presently found on most vehicles in order to provide a small, compact, aesthetically pleasing unit using Fresnel optical components, alone or in combination with other optical elements, to produce such expanded and directed fields of view.

The invention embodying these objects and purposes comprises several forms and embodiments all of which utilize either a Fresnel lens alone or a Fresnel lens in combination with a prism or a Fresnel prism. The invention essentially comprises mounting one or more of the Fresnel components generally in the rearward portions of the passenger compartment of a vehicle and viewing through those components by means of a conventionally provided rear view mirror or a rear view mirror in combination with two other mirrors forming a rear view periscope including the Fresnel elements. Although the systems may be mounted on many other areas of the vehicle in keeping with the spirit of the invention, the placement of the systems as described herein allows the use of previously optically unusable areas of the vehicle to provide a clear, unobstructed view of the whole of the area behind the vehicle. This significantly widened visual area is made possible through the use of compact Fresnel components, the images from which are transmitted through the integral space of the passenger compartment without additional, cumbersome transmitting devices mounted within the vehicle.

The several forms of the invention allow the systems to be used either as primary vision devices, on which the vehicle driver relies primarily for his total rear vision, including areas not otherwise visible from within his vehicle, or as alerting vision devices in which the driver and/or passengers use the optical systems in conjunction with the normally obtainable vision areas in order to provide a warning of vehicles or other objects which may be present in the blind spots normally encountered with the use of the regular, presently known vehicle vision systems.

In one specific form of the invention, a Fresnel lens having a negative focal length is mounted at the rear of the roof of a vehicle, above the central portion of the rear window of the vehicle, in a slightly raised, longitudinally extending, raised portion of the roof. When viewed through the rear view mirror normally provided at the forward portion of the passenger compartment of the vehicle, the Fresnel lens provides an expanded and demagnified viewing area laterally and to the rear of the vehicle which is viewed simultaneously with the normal vision area visible through the rear window of the vehicle.

A second embodiment of the invention includes the use of a second and third mirror mounted adjacent and behind the Fresnel lens at the rear of the roof. The addition of the second and third mirrors provides greater flexibility in the mounting of the Fresnel elements in otherwise inaccessible vehicle areas. In either of these first two forms of the invention, prisms or Fresnel prisms may be used in conjunction with the Fresnel lenses to further direct the fields of view laterally, rearwardly, and/or downwardly to either side of the vehicle.

A modification of these forms of the invention includes the provision of two, longitudinally extending, raised roof portions including a Fresnel lens or a Fresnel lens in combination with a prism or a Fresnel prism secured in the raised portions. The optical elements direct the field of view laterally and to the rear of the sides of the vehicle. Second and third mirrors may be mounted in each of the two raised roof portions in a further modification in order to allow greater flexibility in the positioning of the lenses and prisms.

Yet another form of the invention includes the provision of a negative Fresnel lens in combination with a second mirror and third mirror positioned to provide a laterally rearwardly expanded field of view through a window provided in the rear roof support post on either side of the vehicle. The roof support windows are commonly referred to as "opera windows", and the optical system used in conjunction therewith provides an additional field of view which is generally blocked from view in presently known vehicles having rigid, permanently installed roofs.

It is important to understand that in all these forms of the invention, the expanded fields of view are obtainable using the normally provided rear view mirror at the forward portion of the passenger compartment in combination with the unique Fresnel components. The light rays directed by the optical elements pass through the integral space of the passenger compartment and require no additional tubes, directing devices, or other structures positioned within the vehicle. Moreover, by using the roof and side support portions of the vehicle, expanded fields of view are possible while retaining the normal fields of view visible through the regularly provided window areas of the vehicle. Additionally, for vehicles in which the design criteria have dictated reduced window areas, the present invention provides a means for a greater than normal field of vision without depending on the large window areas which have previously been required.

These and other objects, advantages and features of the invention will become more apparent from the study of the following description taken in conjunction with the drawings.

BRIEF DESCRIPTION OF THE DRAWINGS

FIG. 3 is a fragmentary, plan view of the optical system shown in FIGS. 1 and 2;

FIG. 6 is a fragmentary, cross-sectional, side elevation of another form of the invention including a negative Fresnel lens mounted centrally on the rear roof portion of a vehicle;

FIG. 7 is a fragmentary, side elevation of a vehicle incorporating a modified form of the optical system shown in FIG. 6 wherein the system is used as a primary rear vision device;

FIG. 8 is a fragmentary, plan view of one-half of the vehicle shown in FIG. 7 including the optical system thereof;

FIG. 9 is a fragmentary, plan view of another form of the invention similar to that shown in FIGS. 5-7 additionally including two prisms in combination therewith;

FIG. 12 is a fragmentary, plan view of the optical system shown in FIG. 11;

DESCRIPTION OF THE PREFERRED EMBODIMENTS

Figure 1:
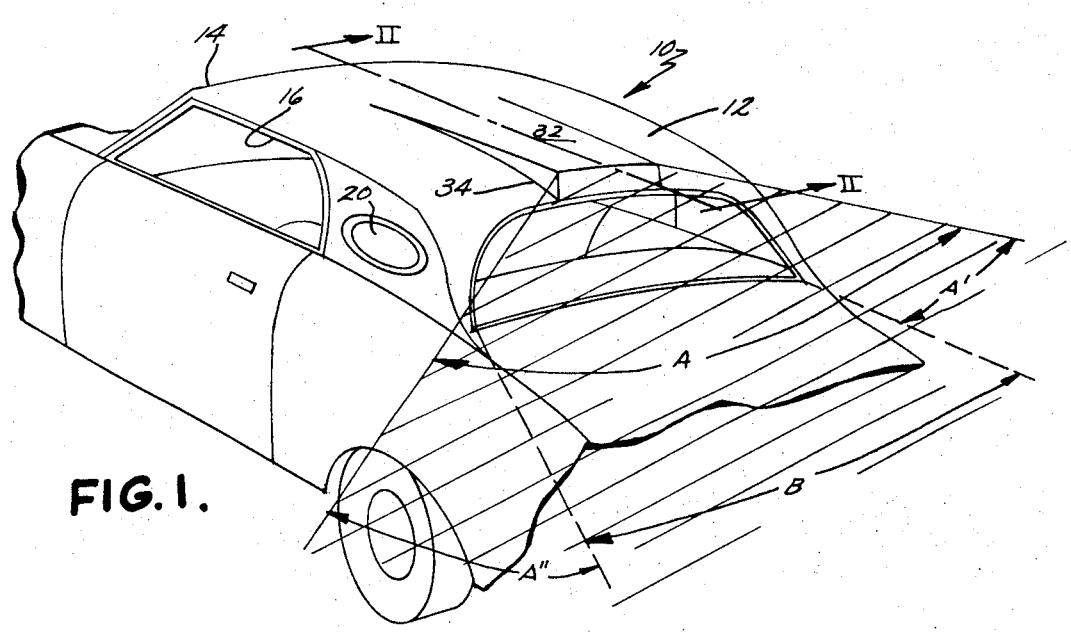
FIG. 1 is a fragmentary, perspective view of an automobile including one form of the invention mounted centrally in the rear of the roof thereof.

Referring now to the drawings in greater detail, several forms of the invention are shown therein comprising modifications and refinements of the embodiment shown in our previous application, referred to above, which application is incorporated by reference herein.

Figure 2:
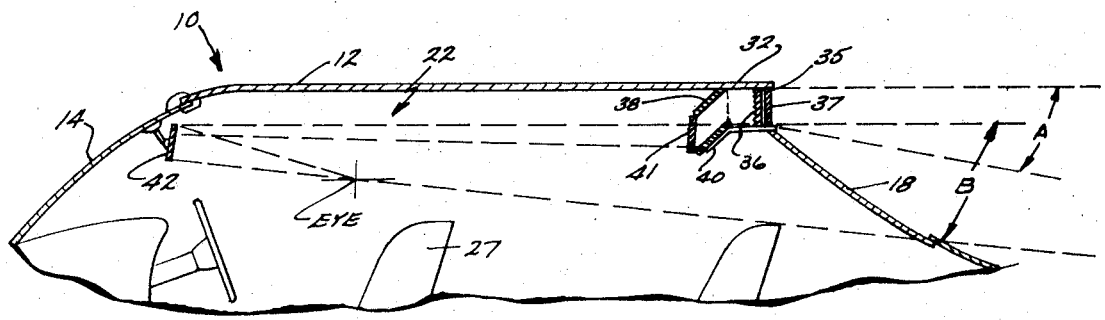
FIG. 2 is a fragmentary, cross-sectional view of the optical system shown in FIG. 1 taken along plane II—II thereof.

Referring now to FIGS. 1–3, a typical automobile 10 is shown wherein one form of the present invention is mounted on the roof portion 12 thereof. The automobile 10 includes a windshield 14, side windows 16, a rear window 18, and roof support windows or opera windows 20. The roof 12 and the various window areas define and enclose a passenger compartment 22 having front and rear areas wherein the driver and passengers are seated during the periods in which the vehicle is in motion.

In the first form of the present invention, the optical system comprises a conventional rear view mirror 42 in the front area and optical components 36, 38 and 40 mounted centrally in a raised roof portion 32 at the rear of the roof 12. The raised roof portion 32 extends generally longitudinally of the roof 12 from approximately the center of the roof to the rear edge of the roof adjacent to and above the rear window 18. It will be noted that the raised portion 32 is generally flush with the forward and central portions of the roof 12 and extends generally along the same horizontal plane as those portions of the roof while the rear of the roof curves generally downwardly to meet the top edge of the rear window 18 as shown at 34.

More specifically, the optical system includes mounted adjacent or on the rear view mirror 42 the windshield 14 and two other mirrors 38 and 40 mounted at the rear of the vehicle adjacent a Fresnel lens 36 which has a negative focal length and is positioned adjacent the rearward facing aperture or opening 35 formed in raised roof portion 32.

Figure 18:
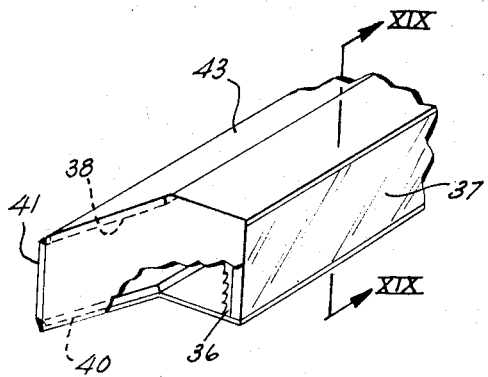
FIG. 18 is a perspective view with portions broken away of the optical unit comprising a portion of the periscopic optical systems of the present invention.
Figure 19:
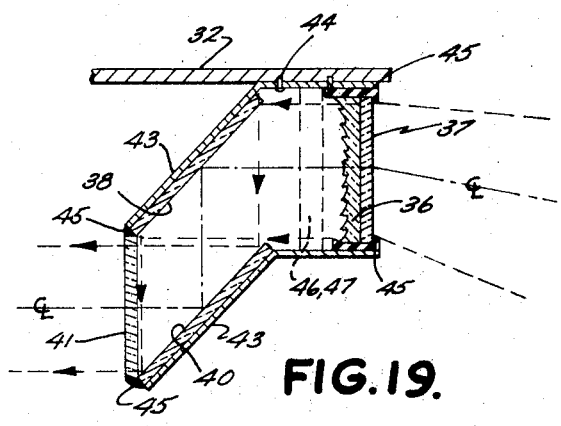
FIG. 19 is a cross-sectional view of the optical unit of FIG. 18 taken along plane XIX—XIX thereof.

As shown in FIGS. 18 and 19, cover glasses 37 and 41, mirrors 38 and 40, and Fresnel lens 36 are preferably mounted in one unit in raised roof portion 32. Mirrors 38 and 40 are secured at approximately 45° to the plane of lens 36. These angles may, of course, be varied depending on the desired field of view and the position of rear view mirror 42. These various optical components are encased by means of an enclosing cover 43 of sheet metal, molded plastic, fiberglass, or the like, which seals out dust, dirt and other foreign objects from the surfaces of the components. The unit is secured in its entirety within raised roof portion 32 with screws 44 or other securing means. In addition rubber grommets 45 are provided around various of the component edges to both further seal and cushion from shock those components. It will be understood that rubber adhesives and the like may also be used for this purpose.

Further, as will be more fully described below, prisms 46 and 47 (shown in phantom in FIG. 19) or Fresnel prisms can also be secured within the encasement 43 to further direct the expanded field of view in another embodiment of the invention.

By this arrangement, rays of light from the expanded and directed field of view A, entering the system from the lateral and rear areas adjacent the vehicle, are directed through the transparent cover 37 and stroke the surface of third mirror 38 which reflects the light to second mirror 40 which in turn directs the light through cover glass 41 to the rear view mirror 42. First mirror 42 directs the light to the eyes of driver or passenger seated in the front seat 27 of the vehicle, as shown in FIGS. 2 and 3.

The negative Fresnel lens 36 is of the type described in our previous application, referred to above, and may be either an optically symmetrical lens (FIGS. 14 and 15) or an optically asymmetrical or "off-axis" lens (lens section X shown in FIGS. 14 and 15) depending on the desired position and scope or field of view required. Thus, an off-axis negative Fresnel lens would be used in positions wherein light rays from above or below the level of the lens, as well as from either side thereof, are required to be focused therethrough.

Figure 15:
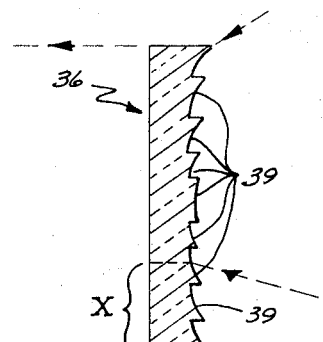
FIG. 15 is a cross-sectional view of the negative Fresnel lens of FIG. 14 taken along plane XV-XV thereof.
Figure 17:
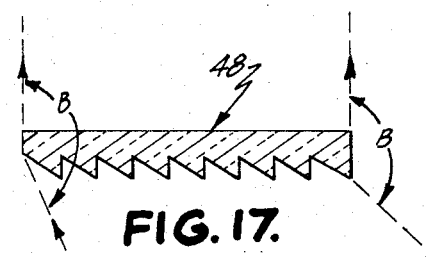
FIG. 17 is a cross-sectional view of the Fresnel prism of FIG. 16 taken along plane XVII—XVII thereof.
Figure 16:
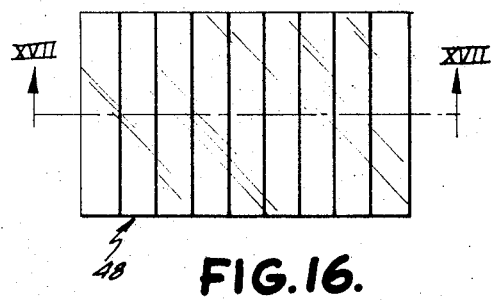
FIG. 16 is a front elevation of a Fresnel prism.
Figure 14:
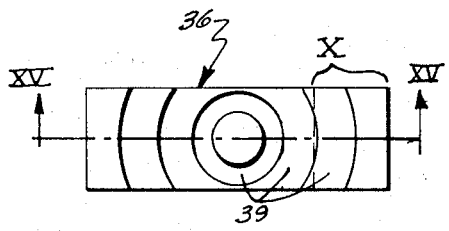
FIG. 14 is a front elevation of a negative Fresnel lens having aspherical lens surface sections.

Further, as shown in FIGS. 14 and 15, the negative Fresnel lens 36 includes aspherical lens surface sections 39. Thus, lens 36 has a plurality of individual surface sections 39 which have been individually designed to approximate aspheric lens surface sections. Thus, the surface of sections 39 can be either aspherically curved, as shown in FIG. 15, or flat depending on the particular lens design. It has been found that using an aspherical negative Fresnel lens greatly reduces the optical aberration such as blurring and the like otherwise encountered in lens having spherical lens surfaces. Additionally, it has been found that the most desirable optical results are produced by maintaining the "f" number of the negative Fresnel lens, i.e., the ratio of focal length to the geometrical diameter of the lens from which the lens section is taken, as close to 1 as is possible. Thus, the "f" number of the lens approximately equals 1, although "f" numbers slightly above or below 1 are acceptable. The images produced using a negative Fresnel lens of this type are demagnified or minified from normal size. Thus, for example, for a negative Fresnel lens having a 10-inch diameter with a focal length having an absolute value of 12 inches, the demagnification is approximately 0.13 or 13 per cent of normal size otherwise visible without the lens. In the preferred embodiments, the Fresnel lenses, as well as the Fresnel prisms referred to below and shown in FIGS. 16 and 17, are molded from transparent plastic thereby obviating the need for expensive grinding operations.

As shown in FIGS. 1–3, the periscopic optical system provides an expanded and demagnified viewing area A which includes areas A' and A" which are beyond and outside the limits of the normally visible viewing area B as viewed in the rear view mirror 42 through the rear window 18. The areas A' and A" are generally lateral of the sides of the vehicle to the rear of the rear window. Depending on the degree of asymmetry of the Fresnel lens chosen, the image visible therethrough may also be directed downwardly to include the area A, as shown in FIG. 2. Thus, it will be understood that when the driver within the vehicle glances into rear view mirror 42, he will see the expanded and demagnified viewing area A visible through the periscopic system 30 in a band along the upper edge of his rear view or first mirrors 42, while the viewing area B normally seen through the rear window 18 may be viewed along the lower portion of the mirror 42.

Consequently, with one glance the driver or passenger will be able to see both the normal and the expanded viewing areas A and B, the normal area being presented at unit magnification or normal size and the expended viewing area being presented at a reduced size, typically 12 per cent to 20 per cent of the normal size. Typically, the visible area through periscopic system 30 subtends a total angle of approximately 60°, or 30° on either side of the vehicle center line. The normal vision area through a typical rear window includes an angle of approximately only 20°–30°. Although the second mirror 40 extends somewhat into the normal viewing area through rear window 18, as shown in FIG. 2, the expanded viewing area visible through the periscopic system entirely compensates for and overcomes the vertical reduction in normal vision otherwise seen in that area.

Figure 4:
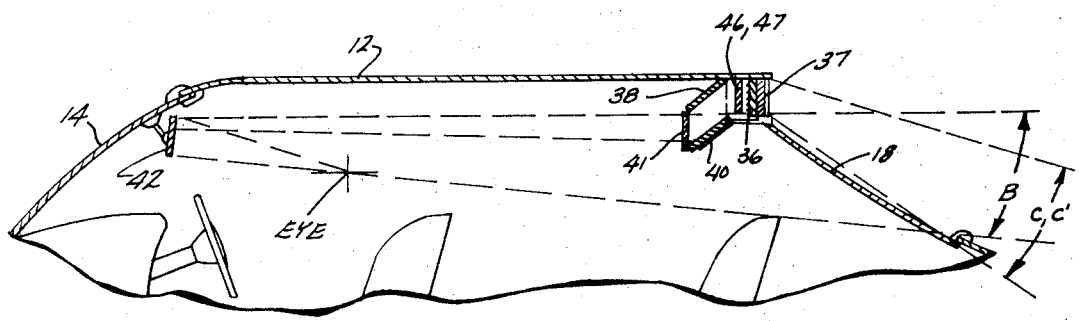
FIG. 4 is a fragmentary, cross-sectional, side elevation of another form of the invention similar to that shown in FIGS. 1-3 but additionally including two prisms in combination therewith
Figure 5:
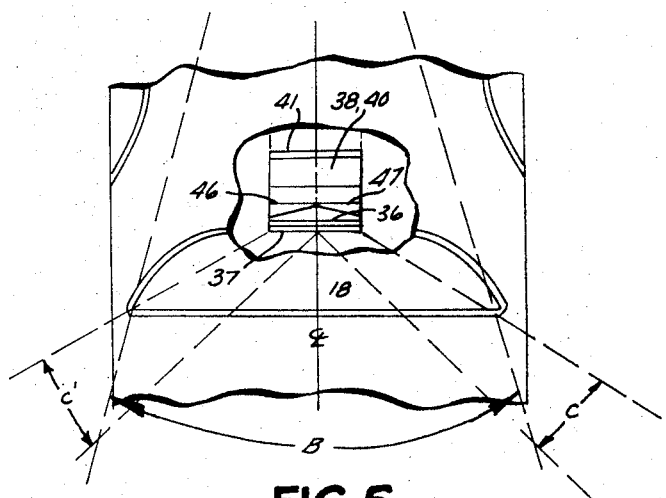
FIG. 5 is a fragmentary, plan view of the optical system shown in FIG. 4.

Referring now to FIG. 4, a second form of the present invention is shown comprising an optical system generally including all the elements shown in the system of FIGS. 1, 2 and 3 with the addition of prisms 46 and 47 in combination therewith. In the embodiment shown in FIG. 4, prisms 46 and 47 are preferably either acrylic plastic or ground glass prisms having their apexes abutting one another along the center line of the vehicle with the inclined surfaces of the prisms facing generally rearwardly and slanting from the center line slightly toward the vehicle rear. The prisms may be mounted either ahead of or behind the lens 36 with no appreciable difference in the expanded and demagnified field of view seen therethrough. Preferably, however, prisms 46 and 47 are enclosed in the unit positioned in the rear roof portion 32 as shown in FIGS. 18 and 19 and mentioned above. As shown in FIGS. 4 and 5, the prisms 46 and 47, in combination with the negative Fresnel lens 36, provide expanded and demagnified viewing areas C and C' directed laterally and to the rear of either side of the vehicle 10 and slightly downwardly. As with the system of FIGS. 1, 2 and 3, the expanded viewing areas are visible on the upper portion of rear view mirror 42 while the normal vision areas through rear window 18 are simultaneously visible on the lower portion of mirror 42. When the optical elements are positioned in this manner, the recently required safety running lights on the fenders of vehicles passing on either side of the subject vehicle 10 will be visible through the periscopic system when the visible field is viewed in the first or rear view mirror 42 of the system. The additional viewing areas C and C' thus supplement and alert the driver and/or passengers within the vehicle to the presence of vehicles or foreign objects laterally of and to the rear of the vehicle. It will be understood that Fresnel prisms of the type described in our previous application, and shown herein in FIGS. 16 and 17, may be used in place of prisms 46 and 47 without altering the expanded and demagnified field of view visible therethrough. The use of the generally planar Fresnel prisms, such as that shown at 48 in FIGS. 16 and 17, allows greater flexibility in the mounting of the various systems since they are much more compact than normal prisms and therefore may be secured in much smaller areas. Prisms 46 and 47 are preferably made from either acrylic plastic or ground glass while the Fresnel prisms are preferably molded from acrylic plastics as mentioned above. Of course, other transparent materials may also be used without deviating from the spirit of the invention. Either the prisms 46 and 47 of the Fresnel prisms 48 may be obtained with various angles of deviation (angle B in FIG. 17) for light incident on the surfaces thereof such that the expanded viewing areas C and C′ may be directed to a greater or lesser degree laterally of and downwardly along the sides of the vehicle 10 as desired in various vehicle designs.

Figures 20, 21:
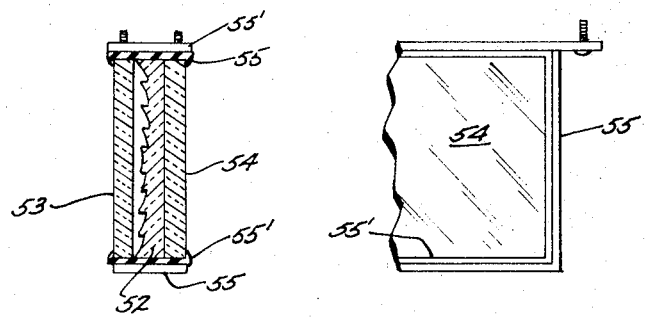
FIG. 20 is a cross-sectional view of the optical unit of the present invention for mounting a negative Fresnel lens.
FIG. 21 is a broken, front elevation of the optical unit of FIG. 20.

Referring now to FIG. 6, a third form of the present invention is shown. The optical system of FIG. 6 comprises a Fresnel lens 52 having a negative focal length mounted between adjacent transparent covers 53 and 54 in the rearward facing opening 35 of the raised roof portion 32. As shown in FIGS. 20 and 21, cover glasses 53 and 54 sandwiching negative Fresnel lens 52 are secured in raised roof portion 32 of a vehicle by means of a support bracket 55 and securing means such as screws or the like. Rubber grommets, gaskets or rubber adhesives are included to further dust off dust and dirt from the grooves of the lens and to cushion the mounting of the several optical components. Rays of light entering the optical system from the expanded viewing area D (FIG. 6) are directed forwardly through the integral space of the passenger compartment 22 to the conventionally mounted rear view mirror 56 mounted in the forward portion 24 of compartment 22. Rear view mirror 56 in turn directs the expanded field of view to the eye position of the driver or passenger located within the vehicle. As described above with periscopic systems of FIGS. 1–5, the expanded and demagnified field of view D will be visible on the upper portion of mirror 56 while the normal sized, regular rear field of view visible through rear window 18 will be visible on the lower portion of mirror 56. Consequently, optical system of FIG. 6 again provides with one glance both the expanded and normal sized fields of view thereby eliminating substantially all the blind spots normally associated with a vehicle such as that shown at 10. The width of this expanded field of view is substantially similar to A shown in FIG. 3 and visible through the periscopic system thereof.

As shown in FIGS. 7 and 8, a negative Fresnel lens in combination with a conventionally mounted rear view mirror may also be mounted as a primary rear vision device in vehicles such as that shown at 57 having designs leaving little or no room for a rear window of conventional size. As shown in FIGS. 7 and 8, a negative Fresnel lens 58 of the type described above is located in a rearward facing aperture in the slightly raised roof of vehicle 57 such that it directs an expanded field of view E into the passenger compartment and onto the full surface area of a conventionally mounted rear view mirror 59 which in turn reflects the image of field of view E to the eye of driver. Vehicle 57 includes no rear window through which any rear view may be obtained. Further, it will be noted that the roof of the vehicle 57 is tapered behind the position of the lens 58 to provide an unobstructed path for the rays of light from the expanded field of view to travel to the lens. In this embodiment, the lens 58 is an off-axis lens section having a degree of asymmetry and a lens diameter chosen specifically, as will be understood by those skilled in the art, to provide the expanded and demagnified field of view substantially as shown at E in FIGS. 7 and 8. Cover glasses (not shown) similar to these shown in FIG. 6 may be included to facilitate cleaning and maintenance of the lens. Thus, the optical systems of the present invention may be used either as primary rearward vision devices in lieu of rear windows or as secondary, supplemental alerting devices to be used in conjunction with the normal vision areas of a vehicle.

Figure 10:
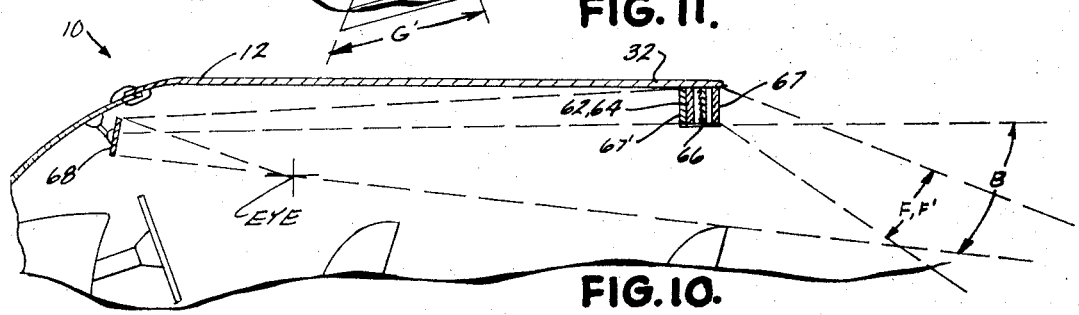
FIG. 10 is a fragmentary, cross-sectional, side elevation of the optical system shown in FIG. 9 taken along plane X—X thereof.

Referring now to FIGS. 9 and 10, the optical system shown in FIG. 6, may be modified to provide an optical system which includes prisms 62 and 64. The prisms 62 and 64 are mounted adjacent a negative Fresnel lens 66 between transparent covers 67 and 67′ within a raised roof portion 32 of roof 12 of vehicle 10. The mounting bracket of FIGS. 20 and 21 may be expanded to include prisms 62 and 64 for securing in raised roof portion 32. The combination prisms and lens are located to direct rays of light from expanded and demagnified viewing areas F and F′ laterally and rearwardly of a vehicle 10 to a conventionally located rear view mirror 68 in the forward portion of the passenger compartment 22 of vehicle 10 and thence to the eye of the driver. In this application, the expanded viewing areas F and F′ supplement and alert the driver of the vehicle to other vehicles and objects not normally visible in the normal viewing area B seen through the rear window 18 of the vehicle. Both expanded and normal vision areas are visible simultaneously on mirror 68, as mentioned above in the other systems. The prisms 62 and 64 are again located with their apexes abutting one another at the center line of the vehicle and with the inclined surfaces facing generally rearwardly. The type of and position of both prisms 62 and 64 and lens 66 may be varied as described above to direct the field of view F and F′ as desired. Further, Fresnel prisms such as that shown in FIGS. 16 and 17 may be substituted for the regular prisms shown in FIGS. 9 and 10 to afford a substantial savings in space while accomplishing the same expanded field of view.

Figure 11:
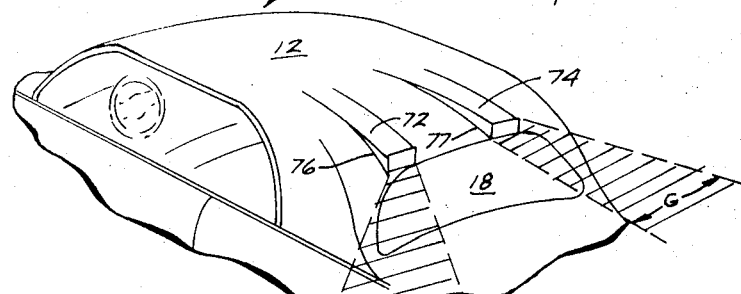
FIG. 11 is a fragmentary, perspective view of a modified form of the invention wherein the optical systems are mounted in two raised roof portions of a vehicle.

Another form of the invention is shown in FIGS. 11 and 12 wherein optical elements forming an optical system are located within two raised roof portions on the roof 12 of a vehicle 10. Thus, roof 12 includes raised portions 72 and 74, one on either side of the vehicle center line, such that they extend generally longitudinally along a line of sight between the position of the conventionally mounted rear view mirror at the front portion of the roof 12 to the lateral portions of the rear window 18. The length of portions 72 and 74 is from the approximate center of the roof 12 to the area adjacent and over the edge of the rear window 18. As with the centrally located raised roof portion 32 described above, the dual raised portions 72 and 74 extend substantially flush with the highest portion of the roof 12 while the rear portion of the roof curves generally downwardly to meet the edge of the rear window 18 as shown at 76 and 77. The raised portions 72 and 74 each include a rearwardly facing opening or aperture 78 and 79, respectively, wherein the optical elements comprising the optical system 70 are mounted. The optical elements include negative Fresnel lenses 80 and 81 in combination with regular prisms 82 and 83 (shown in FIG. 12) or Fresnel prisms (not shown). These elements are positioned between cover glasses 85, 85', 86 and 86' and mounted in roof portions 72 and 74 in a manner similar to that shown in FIGS. 20 and 21. Further, second and third mirrors for periscopic systems similar to those described above may be secured adjacent the Fresnel components in each of raised portions 72 and 74 in a manner similar to that shown in FIGS. 18 and 19. This allows greater flexibility in the positioning of the raised portions themselves, the Fresnel optical components, or the expanded fields of view obtainable therewith. The combination of lens and prism of FIG. 12 will provide expanded and demagnified viewing areas G and G' along the lateral sides of the vehicle 10 toward the rear of the vehicle. The rays of light entering from the expanded fields of view are directed by the optical elements 80 through 83 to a conventionally mounted rear view mirror 84 at the forward portion 24 of the passenger compartment 22. Mirror 84 reflects the rays toward the eye of the driver. As will be understood, the optical system of FIG. 12 comprises a supplement to the normal vision area B visible through rear window 18 to warn the driver of other vehicles or objects on either side of his vehicle.

Figure 13:
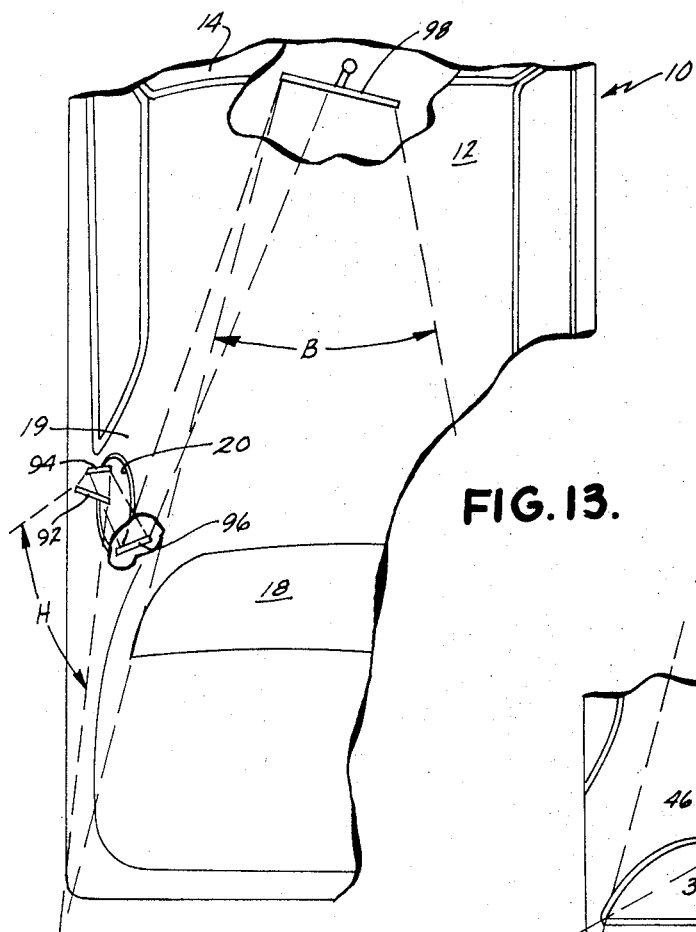
FIG. 13 is a fragmentary, plan view of a modified form of the optical system mounted in combination with an opera window in a rear roof support post of a vehicle.

Referring now to FIG. 13, another form of the present invention is shown which provides an additional expanded viewing area H through opera window 20 disposed in rear roof support post 19 of roof 12. The optical system of FIG. 13 comprises a Fresnel lens 92 having a negative focal length mounted adjacent the exterior of opera window 20 and facing generally rearwardly along the rear quarter panel of the vehicle 10 such that it directs rays of light from the expanded field to a third mirror 94 also positioned adjacent window 20 on the exterior thereof. Mirror 94 is positioned to direct the rays of light from lens 92 at an angle through the glass of window 20 to a second mirror 96 disposed adjacent the upper window 20 on the interior thereof. Mirror 96 in turn is positioned to direct the rays of light from the expanded field of view H to a first mirror or conventionally located rear view mirror 98 located in the forward portion of the passenger compartment 22 adjacent the windshield 14. Mirror 98 in turn reflects the rays of light to the eye position of the driver of the vehicle. In providing an expanded and demagnified field of view H supplementing the normal field of vision B visible through rear window 18, the optical system of FIG. 13 provides a useful vision aiding system which is incorporated on the vehicle without providing any especially designed protruding mounting areas for the system. It will be understood that similar systems will be mounted on either side of the vehicle 10 such that expanded viewing areas H are visible through the opera windows 20 on either side of the vehicle.

With any of the optical systems described herein, it will be understood that a vehicle passing on either side of subject vehicle 10 will be in the driver's field of view at substantially all times since, as the rear of the passing vehicles leaves the expanded field of view visible through the optical systems of this invention, the forward portion of the passing vehicles will become visible in the driver's unaided peripheral vision area adjacent his position in the forward or front seat of the vehicle 10.

Further, the present optical systems may be used by drivers of various sizes merely by adjusting the positions of the conventionally mounted rear view mirrors in the forward portion of the passenger compartment up or down to correspond to the driver's eye position. A convenient and effective means for adjusting the position of the conventionally mounted rear view mirrors used in the present periscopic systems is disclosed in patent application Ser. No. 167,730, filed July 29, 1971, entitled REAR VIEW PERISCOPE ADJUSTMENT MEANS FOR VEHICLES, assigned to the same assignee as the present application. This adjustment means enables drivers of all sizes to obtain the same field of view in the first mirror of the periscopic system.

As will now be understood, the optical systems as above described provide vision aiding devices for vehicles which may be used as primary vision devices as well as supplemental, secondary or alerting devices for warning of the presence of other vehicles, objects and the like. The optical systems of FIGS. 1–3 and 6–8, using negative Fresnel lenses without prisms, including expanded viewing areas encompassing the entirety of the area to the rear of the vehicle. The optical systems of FIGS. 4–5 and 9–13, using negative Fresnel lenses in combination with either regular or Fresnel prisms, include expanded and demagnified viewing areas which are directed at specific areas adjacent the vehicle, most notably along the lateral sides of the vehicle adjacent the rear of the vehicle in order to eliminate troublesome blind spots. The systems are mounted in previously optically unusable roof areas of the vehicle adjacent the rear window of the vehicle in raised areas which extend flush with the top of the roof and are therefore unobtrusive and aesthetically pleasing while providing a substantially increased field of view for the driver of the vehicle. Similarly, three mirror periscopic systems including Fresnel lenses or Fresnel lenses in combination with prisms or Fresnel prisms are utilized to allow the systems to be positioned in otherwise inaccessible areas while the expanded fields of view visible from those positions are directed by means of the mirrors to the position of the driver's eye. All of the systems provide a flat, wide scope, expanded field of view without any bowed or curved effect which had been previously obtained with convex mirrors and the like. Further, the optical systems provide the flexibility of choosing the Fresnel and other optical elements to provide the expanded and directed fields of view as desired in order to overcome specific blind spots while maintaining the design and styling characteristics of the particular vehicle on which the systems are installed.

While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims which follow.

The embodiments of the invention in which an exclusive property or privilege is claimed are defined as follows.

1. An optical system for a vehicle, said system comprising a Fresnel lens having a negative focal length, said lens being mounted on a vehicle along a line of sight extending from a specified position within said vehicle through an aperture in the structure of said vehicle, said position being the normal position of the eyes of a driver of said vehicle; said lens providing an expanded, demagnified viewing area for said person; said viewing area including areas normally blocked from view from a person in said specified position.

2. The optical system of claim 1 wherein said lens is aspherical to reduce optical distortion.

3. The optical system of claim 2 in combination with at least one rear view mirror disposed on said vehicle along said line of sight intermediate said lens and said specified position.

4. The optical system of claim 3 wherein said lens is mounted adjacent a rear window included in said vehicle; said lens providing an expanded and demagnified viewing area laterally and to the rear of said vehicle.

5. A combination vehicle and view expanding and directing optical system therefor, said vehicle including a passenger compartment, roof and rear window; said roof including at least one generally rearwardly facing aperture at the rear thereof; said system comprising in combination an optical unit including a Fresnel lens having a negative focal length secured to said roof adjacent said aperture; and a rearview mirror mounted within said compartment in the forward portion thereof; said optical unit directing light from an expanded, demagnified field of view to the rear and laterally of said vehicle through the integral space of said compartment to said rearview mirror; said mirror reflecting said light to the eyes of a person located within said compartment.

6. The optical system of claim 5 wherein said Fresnel lens is aspherical to reduce optical distortion.

7. The optical system of claim 5 wherein said roof slopes downwardly from front to rear and includes at least one raised portion at the rear thereof; said raised portion having its top flush with the front of said roof; said aperture disposed at the rear of said raised portion; said optical unit secured within the interior of said raised roof portion.

8. The optical system of claim 7 wherein said optical unit further includes prism means mounted adjacent said Fresnel lens; said prism means further directing said expanded and demagnified field of view to the rear and laterally of the sides of said vehicle.

9. The optical system of claim 8 wherein said prism means are Fresnel prisms.

10. The optical system of claim 9 wherein said Fresnel lens is aspherical to reduce optical distortion.

11. The optical system of claim 7 wherein said roof includes two of said raised portions, one raised portion formed on either side of the center line of said vehicle such that both extend generally longitudinally of said vehicle; each of said raised portions including one of said optical units secured within the interior thereof.

12. The optical system of claim 11 wherein said optical units each include in combination a prism and a Fresnel lens; each of said optical units directing said expanded and demagnified field of view laterally and to the rear of the same side of said vehicle on which they are mounted.

13. The optical system of claim 12 wherein said prism is a Fresnel prism.

14. An optical system for vehicles adapted to provide rearward vision for the driver of a vehicle; said system comprising a Fresnel lens having a negative focal length mounted on a vehicle and directing rays of light to a rearwardly facing mirror mounted within said vehicle and positioned to direct said rays to the eyes of said driver; said system providing an expanded and demagnified viewing area laterally and to the rear of said vehicle such that at least some portions of other vehicles passing said vehicle are within said driver's field of view at substantially all times.

15. The optical system of claim 14 wherein said lens is mounted on the roof of said vehicle; said lens being an off-axis lens section directing said rays through a substantially horizontal aperture in said roof to said mirror.

* * * * *